(12) United States Patent
Shen et al.

(10) Patent No.: US 8,823,796 B2
(45) Date of Patent: Sep. 2, 2014

(54) ADAPTIVE SURROUNDING VIEW MONITORING APPARATUS AND METHOD THEREOF

(75) Inventors: Hsin-Liang Shen, Yunlin County (TW); Kuo-Hsiang Cheng, Taipei County (TW); Tsung-Tyng Tuan, Hsinchu (TW); Yen-Shu Chang, Taoyuan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 490 days.

(21) Appl. No.: 13/157,966

(22) Filed: Jun. 10, 2011

(65) Prior Publication Data

US 2012/0249791 A1 Oct. 4, 2012

(30) Foreign Application Priority Data

Apr. 1, 2011 (TW) .............................. 100111504 A

(51) Int. Cl.
*H04N 7/18* (2006.01)
*B60R 1/00* (2006.01)

(52) U.S. Cl.
CPC .......... *H04N 7/181* (2013.01); *B60R 2300/605* (2013.01); *B60R 2300/802* (2013.01); *B60R 1/00* (2013.01)
USPC ......................................................... 348/148

(58) Field of Classification Search
USPC ......................................................... 348/148
See application file for complete search history.

(56) References Cited

U.S. PATENT DOCUMENTS

| 5,680,123 | A * | 10/1997 | Lee ................................ 340/937 |
| 6,535,242 | B1 * | 3/2003 | Strumolo et al. ............. 348/148 |
| 7,171,027 | B2 * | 1/2007 | Satoh ............................ 382/104 |
| 2003/0080877 | A1 * | 5/2003 | Takagi et al. ............... 340/932.2 |
| 2003/0090570 | A1 * | 5/2003 | Takagi et al. ................. 348/148 |
| 2003/0137586 | A1 * | 7/2003 | Lewellen ...................... 348/148 |
| 2005/0174429 | A1 * | 8/2005 | Yanai ............................ 348/148 |

(Continued)

FOREIGN PATENT DOCUMENTS

| CN | 101396989 A | 4/2009 |
| JP | 2010166196 | 7/2010 |

(Continued)

OTHER PUBLICATIONS

Intellectual Property Office, Ministry of Economic Affairs, R.O.C., "Office Action", Jun. 21, 2013, Taiwan.

(Continued)

*Primary Examiner* — Sath V Perungavoor
*Assistant Examiner* — Peter D Le
(74) *Attorney, Agent, or Firm* — Morris Manning & Martin LLP; Tim Tingkang Xia, Esq.

(57) ABSTRACT

An adaptive surrounding view monitoring apparatus and a method thereof are disclosed, in which the apparatus uses a steerable camera set to take horizontal images while sending the horizontal images to a control unit where they are combined into an image of 180-degree or 360-degree surrounding view. It is noted that the surrounding view image maybe an image of front surrounding view, an image of rear surrounding view or an image of ambient surrounding view relating to a vehicle, and using that, visual blind spot of a driver driving the vehicle can be eliminated and the field of vision is widened, and thereby, the probability of accident occurring is reduced.

16 Claims, 6 Drawing Sheets

(56) References Cited

U.S. PATENT DOCUMENTS

| | | | |
|---|---|---|---|
| 2005/0225636 A1* | 10/2005 | Maemura et al. | 348/148 |
| 2005/0240342 A1* | 10/2005 | Ishihara et al. | 701/208 |
| 2006/0119472 A1* | 6/2006 | Tsuboi | 340/435 |
| 2006/0215020 A1* | 9/2006 | Mori et al. | 348/119 |
| 2007/0299584 A1* | 12/2007 | Okamoto et al. | 701/41 |
| 2008/0055411 A1* | 3/2008 | Lee | 348/148 |
| 2009/0085913 A1* | 4/2009 | Sakamoto et al. | 345/420 |
| 2009/0143967 A1* | 6/2009 | Lee et al. | 701/119 |
| 2010/0066518 A1* | 3/2010 | Ohshima et al. | 340/435 |
| 2010/0208073 A1 | 8/2010 | Hattori | |
| 2010/0220189 A1* | 9/2010 | Yanagi | 348/148 |
| 2010/0245577 A1 | 9/2010 | Yamamoto et al. | |
| 2011/0106380 A1* | 5/2011 | Wang et al. | 701/36 |
| 2011/0181406 A1* | 7/2011 | Lin | 340/425.5 |
| 2012/0158256 A1* | 6/2012 | Kuboyama et al. | 701/51 |
| 2013/0155236 A1* | 6/2013 | Ramdeo | 348/148 |

FOREIGN PATENT DOCUMENTS

| | | |
|---|---|---|
| TW | I293610 | 11/2007 |
| TW | M332046 | 5/2008 |
| TW | 200933526 | 8/2009 |
| TW | M371664 | 1/2010 |
| TW | M373507 | 2/2010 |

OTHER PUBLICATIONS

Chung, Yu-Chi, Video Sticking Technique for Enhancing the Rear Viewing Angle on a Moving Vehicle, Thesis, National Chung Cheng University, Nov. 3, 2008.

Shen, Hsin-Liang, Image Optimization Technology Based on the Panoramic Bird's Eye View Parking Assistance System Monitoring, Monthly Vehicle Industry, Jul. 1, 2010, Taiwan.

State Intellectual Property Office of the People's Republic of China, "Office Action", China, Apr. 2, 2014.

* cited by examiner

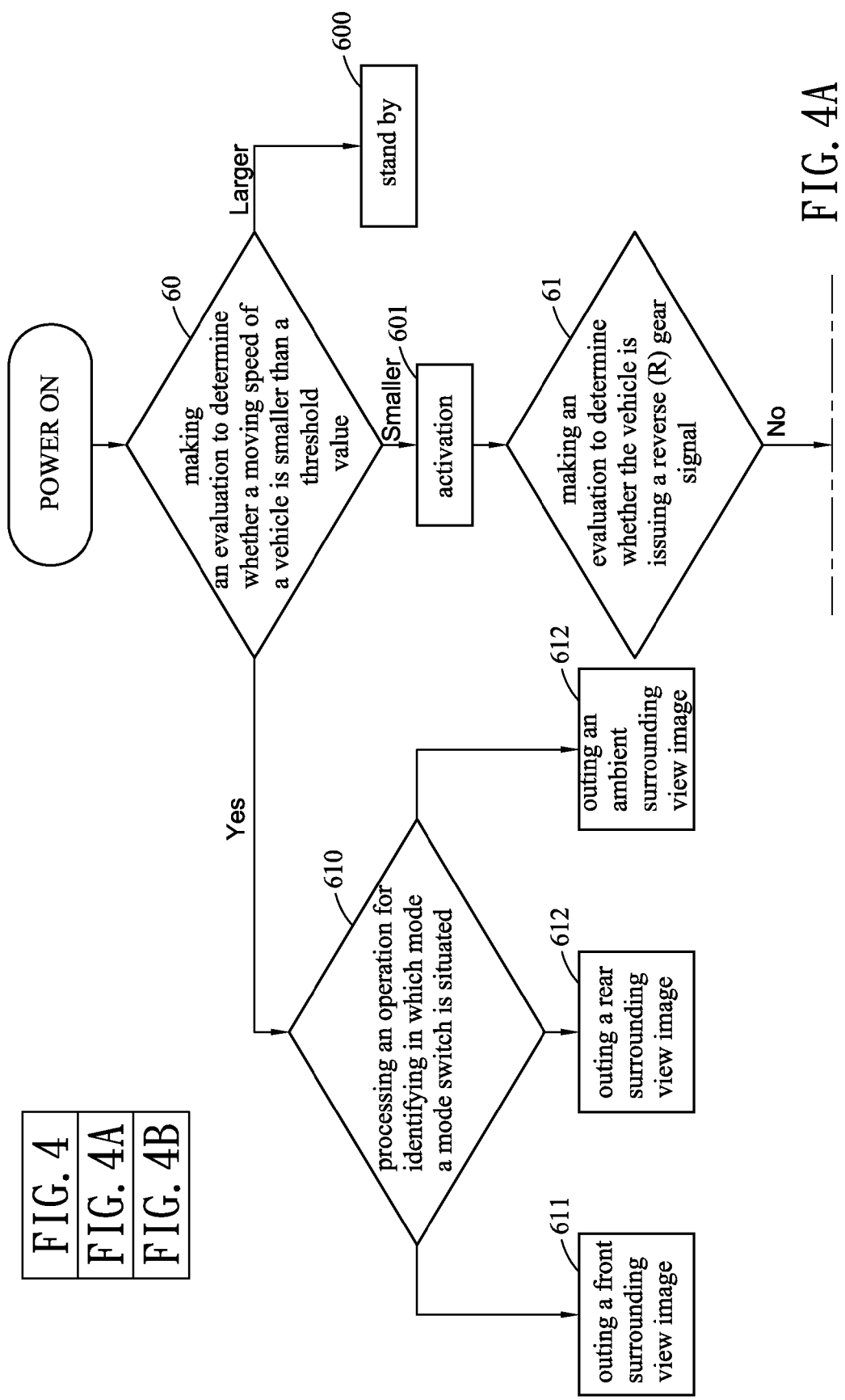

ADAPTIVE SURROUNDING VIEW MONITORING APPARATUS AND METHOD THEREOF

CROSS-REFERENCE TO RELATED APPLICATION

This non-provisional application claims priority under 35 U.S.C. §119(a) on Patent Application No. 100111504 filed in Taiwan (R.O.C.) on Apr. 1, 2011, the entire contents of which are hereby incorporated by reference.

FIELD

The present disclosure relates to an adaptive surrounding view monitoring apparatus and method thereof, and more particularly, to a monitoring apparatus capable of using a steerable camera set for taking a series of images relating to ambient environment of a vehicle in a horizontal manner while sending the series of images to a control unit to be combined into an image of surrounding view so as to be provided to a driver of the vehicle. Consequently, not only visual blind spots of the driver can be eliminated, but also the field of vision is widened, and thereby, the probability of accident occurring is reduced.

BACKGROUND

Pillars are the vertical supports of the passenger compartment of a vehicle, that are known respectively as the A, B, C or D-pillar moving in profile view from the front to rear. Such pillar nomenclature derived from viewing a vehicle in profile can be used as reference points for the passenger compartment of a vehicle. Among which, the A-pillar of a vehicle is the first pillar of the passenger compartment, usually is the one arranged at a position between side-view mirrors and the windshield. The B-pillar of a vehicle is the second pillar of the passenger compartment, after the A-Pillar. The B-pillar, usually used to house the hinges for any rear doors, is the one arranged at a position between the front seats and the rear seats. The C-pillar generally is rearmost pillar supporting the back window and the rear part of a vehicle roof, that is arranged at a position corresponding to the headrest of the rear seat.

For a driver driving a vehicle, there can be plenty of blind spots existed surrounding the vehicle that cannot be directly observed or through either the rear-view or side-view mirrors by the driver while at the controls due to the obstruction of the vehicle's body structure. Consequently, the driver will have to turn one's head or even change one's body position while negotiating a turn, backing up or changing lane so as to be free from the obstruction of the vehicle's body structure, such as the A-pillars, or the limited field-of-view of its rear-view and side-view mirrors. However, such driving behaviors may increase the risk of collision.

It is noted that humans have an almost 210-degree forward-facing horizontal field of view. However, the range of visual abilities is not uniform across a field of view. For humans that are not moving, the ability to perceive shape and motion clearly only covers about 70 degrees of the field of view. However, when one is riding on a moving vehicle, the slower the vehicle is moving, the larger the field of view will be, and vice versa. Thus, since a driver's field of view is decreasing with the increasing of driving speed and the driver's field of view can further be restricted by a vehicle's body structure, such as the A-pillars, while driving the vehicle, there can be plenty of blind spots existed surrounding the vehicle and thus any driving condition happening in the adjacent lanes of the vehicle that fall into these blind spots may not be visible and awared by the driver.

In response to the aforesaid situations, there are already many commercial equipments that can help eliminating blind spots by providing bird-view images showing ambient environment of a vehicle or images respectively capturing the front, left, right and rear view of the vehicle. Nevertheless, those equipments still have the following shortcomings:

1. For bird-view image, objects shown in a bird-view image, especially those non-ground objects, will be distorted and thus might not be easily identified.
2. It is difficult to form a seamless stitching image using a plurality of bird-view images capturing respectively different ambient areas of a vehicle, since there can be ambient areas that are not included in the plural bird-view images.
3. For images with overlapping field-of-view, ultrasonic radars are generally being used for detecting the actual situation in that overlapping area.
4. Those equipments can only display one image of a single direction or simultaneously two images of two different directions, but are not able to display images of adjacent directions, resulting that there are still blind spots existed.

To sum up, the equipments that are current available not only fail to provide distortion-free images that can include all the ambient areas of a vehicle without blind spots, but also fail to display images of adjacent directions simultaneously in addition to their having to use additional devices other than those used for generating images.

SUMMARY

The object of the present disclosure is to provide an adaptive surrounding view monitoring apparatus and a method thereof, in which the apparatus uses a steerable camera set to take images while sending the images to an image process unit where they are distorted, aligned and mosaicked into a panoramic image of surrounding view, to be used for assisting a driver to clearly observe the ambient environment of a vehicle at control without any blind spot, and thereby, not only the probability of accident occurring is reduced, but also the prior art shortcomings of failing to display images of adjacent directions simultaneously in addition to their having to use additional devices other than those used for generating images can be prevented.

To achieve the above object, the present disclosure provides an adaptive surrounding view monitoring apparatus, comprising: a steerable camera set; a control unit, connected to the steerable camera set; a display unit, electrically connected to the control unit; and a mode switch, electrically connected to the control unit.

Moreover, the present disclosure further provides an adaptive surrounding view monitoring method, comprising the steps of:

making an evaluation to determine whether a moving speed of a vehicle is smaller than a threshold value; if so, enabling a control unit to be situated in an activation state; otherwise, enabling the control unit to be situated in a standby state;

making an evaluation to determine whether the vehicle is issuing a reverse (R) gear signal; if so, processing an operation for identifying in which mode a mode switch is situated;

processing an operation for outing a front surrounding view image relating to the front of the vehicle to a display unit for displaying, if the mode switch is identified to be situated in a front surrounding view mode;

processing an operation for outing a rear surrounding view image relating to the rear of the vehicle to a display unit for displaying, if the mode switch is identified to be situated in a rear surrounding view mode; and processing an operation for outing an ambient surrounding view image relating to the ambient environment of the vehicle to a display unit for displaying, if the mode switch is identified to be situated in an ambient surrounding view mode.

To sum up, the adaptive surrounding view monitoring apparatus and the method thereof that are provided in the present disclosure have the following advantages:

1. As the steerable camera set is designed to capture images in a horizontal manner, those non-ground objects can be shown without distortion and thus can be easily identified.
2. Using the apparatus and method of the present disclosure, an image of 180-degree or 360-degree surrounding view relating to the ambient environment of a vehicle can be obtained, and thereby, the field of view of the driver at control of the vehicle can be widened without any blind spot.
3. Since all the blind spots of the vehicle are eliminated using the surrounding view image, there is no need to have additional devices other than those used for generating images to be installed in the monitoring apparatus for detecting ambient environment of the vehicle.
4. Since the surrounding view image includes images of adjacent directions or images of multiple directions, not only the field of view is widened, but also the blind spots are eliminated.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
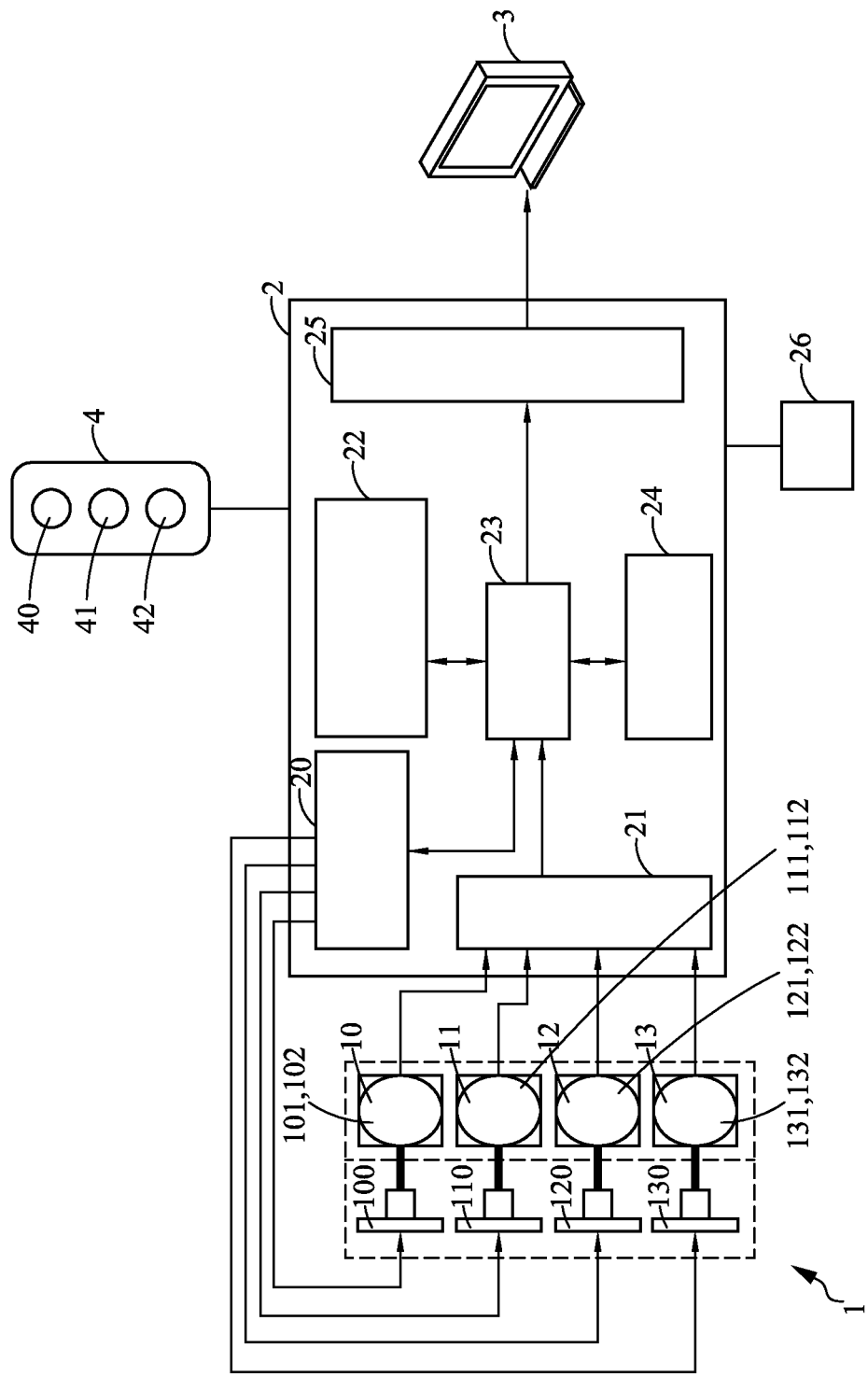
FIG. 1 is a schematic diagram showing an adaptive surrounding view monitoring apparatus according to the present disclosure.

Please refer to FIG. 1, which is a schematic diagram showing an adaptive surrounding view monitoring apparatus according to the present disclosure. As shown in FIG. 1, the adaptive surrounding view monitoring apparatus comprises: a steerable camera set 1, a control unit 2, a display 3 and a mode switch 4.

In FIG. 1, the steerable camera set 1 includes a plurality of steerable cameras, such as the four cameras 10, 11, 12, 13, whereas each steerable camera is comprised of: a micro process unit, a motor module and an image sensor, such as the micro process units 100, 110, 120, 130, the motor modules 101, 111, 121, 131 and the image sensors 102, 112, 122, 132 respectively for the four steerable cameras 10, 11, 12, 13. Moreover, the motor modules 101, 111, 121, 131 are electrically connected to the image sensors 102, 112, 122, 132 in respective for enabling the image sensors 102, 112, 122, 132 to be steered and orientated toward their respective angles as required. It is noted that the horizontal field of view of each steerable camera is between 40 degrees and 210 degrees; and for clarity, the cameras included in the steerable camera set are divided into four groups, which are a first steerable camera group, a second steerable camera group, a third steerable camera group and a fourth steerable camera group.

In this embodiment, the control unit 2 is further configured with a camera control element 20, an image input element 21, a signal processing element 22, an image processing element 23, a memory element 24, an image output element 25 and an image database 26

The camera control element 20 is electrically connected to the micro process units 100, 110, 120, 130 of the four cameras 10, 11, 12, 13 in respective for controlling the steerable cameras 10, 11, 12, 13, and simultaneously the camera control element 20 is electrically connected to the image processing element 23, whereas the four steerable cameras 10, 11, 12, 13 are respectively being included in the first steerable camera group, the second steerable camera group, the third steerable camera group and the fourth steerable camera group.

The image input element 21 is electrically connected to the image sensor of each steerable camera, i.e. the four images sensors 102, 112, 122, 132, in the steerable camera set 1 where the analog signals from those image sensors are converted into digital signals, and simultaneously the image input element 21 is electrically connected to the image processing element 23.

The signal processing element 22 is provided for processing a signal transmitted from the vehicle, such as a left-turn signal, a right-turn signal, a signal relating to the moving speed of the vehicle, a reverse (R) gear signal, a non-reverse (R) gear signal, a mode switch signal, and so on. As shown in FIG. 1, the signal processing element 22 is electrically connected to the image processing element 23 for transmitting the vehicle signal to the image processing element 23 for enabling the image processing element 23 to issue a command correspondingly.

The image processing element 23 is used for distorting, aligning and mosaicking into a panoramic image of surrounding view and also for device activation control. It is noted that the image mosaicking method for the image processing element 23 had already been disclosed in TW Pat. Appl. No, 098145942, and thus will not be described further herein.

The memory element 24, being used for data registering or buffering, is electrically connected to the image processing element 23.

The image output element 25, being used for converting digital signals into analog signals, is electrically connected to the image processing element 23.

Moreover, the image database 26 is also electrically connected to the image processing element 23 so as to be used for storing images that are processed by the image processing element 23.

In addition, the display unit 3 is electrically connected to the image processing element 23 for image displaying; and the mode switch 4, being embedded with a front surrounding view mode 40, a rear surrounding view mode 41 and an ambient surrounding view mode 42, is also electrically connected to the image processing element 23. Moreover, all the aforesaid electrical connections are respectively being enabled by a means selected from the group consisting of: a wired means and a wireless means.

Figure 2:
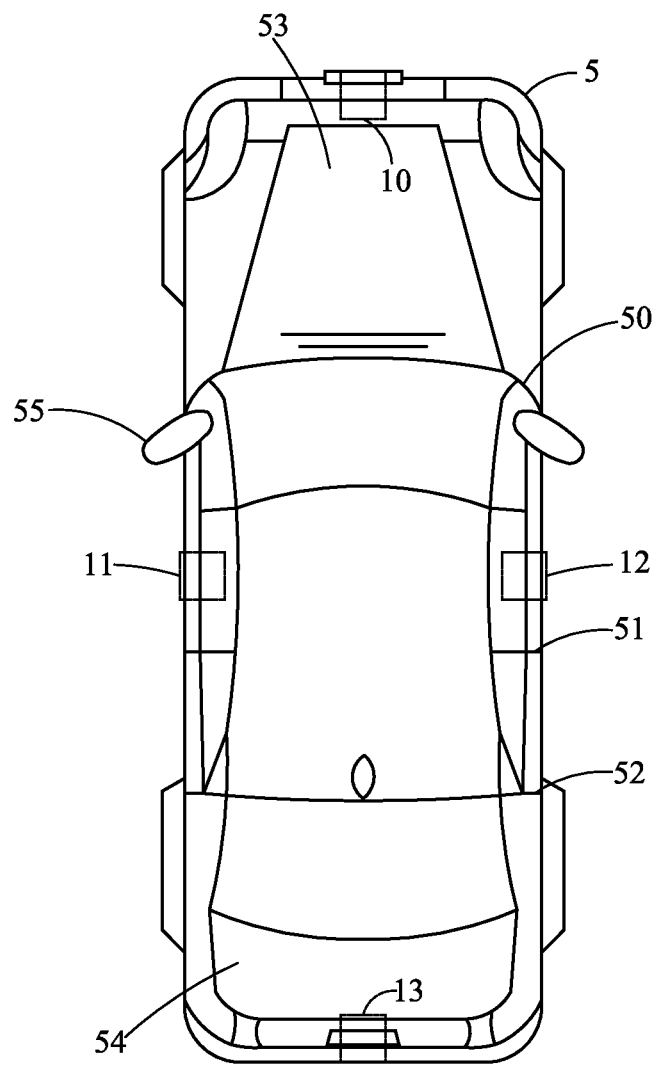
FIG. 2 is a schematic diagram showing a steerable camera set that is mounted on a vehicle according to an embodiment of the present disclosure.

Please refer to FIG. 2, which is a schematic diagram showing a steerable camera set that is mounted on a vehicle according to an embodiment of the present disclosure. As shown in FIG. 2, there is a steerable camera set 1 mounted on a vehicle 5, whereas the vehicle 5 is configured with a front 53, a rear 54, two A-pillars 50, two B-pillars 51, a C-pillars 52 and two rear-view mirrors 55 in a manner that the two A-pillars 50 are disposed respectively at the two sides of the vehicle 5, which are the same to the two B-pillars 51 and the two C-pillars 52, while the two rear-view mirrors 55 are arranged at positions respectively corresponding to the two A-pillars 50.

In FIG. 2, the steerable camera 10 is arranged at the middle of the front 53 of the vehicle 5, and thus is being grouped in the first steerable camera group; the steerable camera 11 is arranged at the left side of the vehicle 5 at a position between the left A-pillar 50 and the left C-pillar 52 or at a position corresponding to the left B-pillar 51, and thus is being grouped in the second steerable camera group; the steerable camera 12 is arranged at the right side of the vehicle 5 at a position between the right A-pillar 50 and the right C-pillar 52 or at a position corresponding to the right B-pillar 51, and thus is being grouped in the third steerable camera group; and the steerable camera 13 is arranged at the middle of the rear 54 of the vehicle 5, and thus is being grouped in the fourth steerable camera group.

Figure 3:
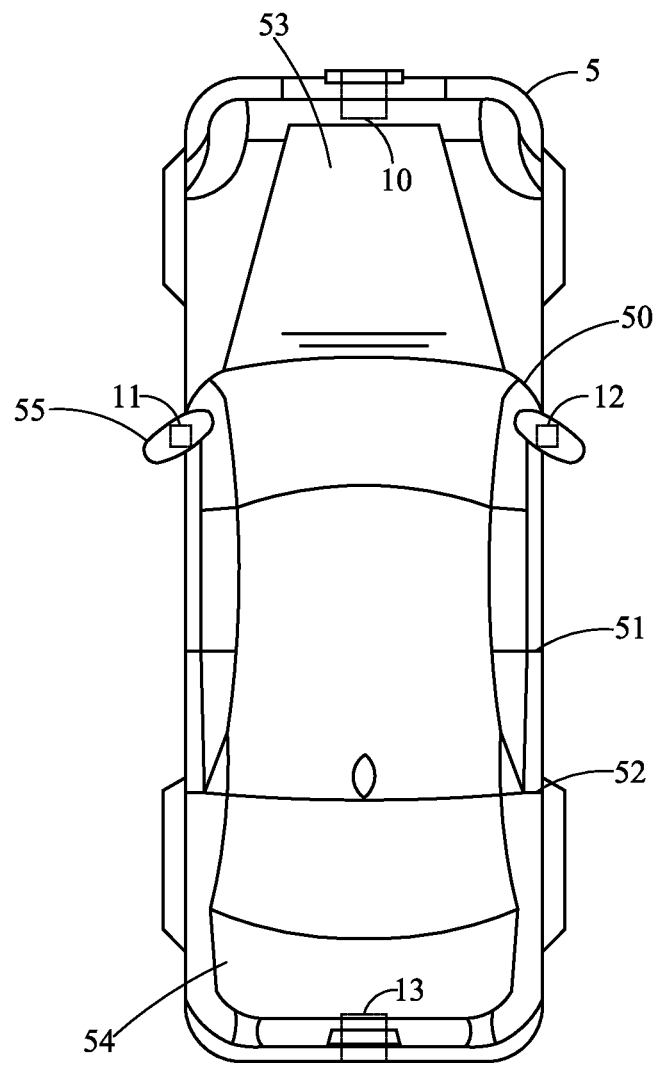
FIG. 3 is a schematic diagram showing a steerable camera set that is mounted on a vehicle according to another embodiment of the present disclosure.

Please refer to FIG. 3 is a schematic diagram showing a steerable camera set that is mounted on a vehicle according to another embodiment of the present disclosure. In FIG. 3, the cameras 10, 13, that are grouped respectively in the first steerable camera group and the fourth steerable camera group, are being disposed at positions the same as those shown in FIG. 2, while the two cameras 11, 13, that are grouped respectively in the second steerable camera group and the third steerable camera group, are disposed at positions corresponding to the two rear-view mirror 55 in respectively.

Moreover, the control unit 2, the display unit 3 and the mode switch 4 can be arranged inside the frame of the vehicle 5, in which the mode switch 4 and the display unit 3 should be arranged at positions proximate to a driver of the vehicle 5 so as to facilitating the driver to easily view the images displayed on the display unit 3 and also to change to the required image mode through the control of the mode switch 4.

Figure 4B:
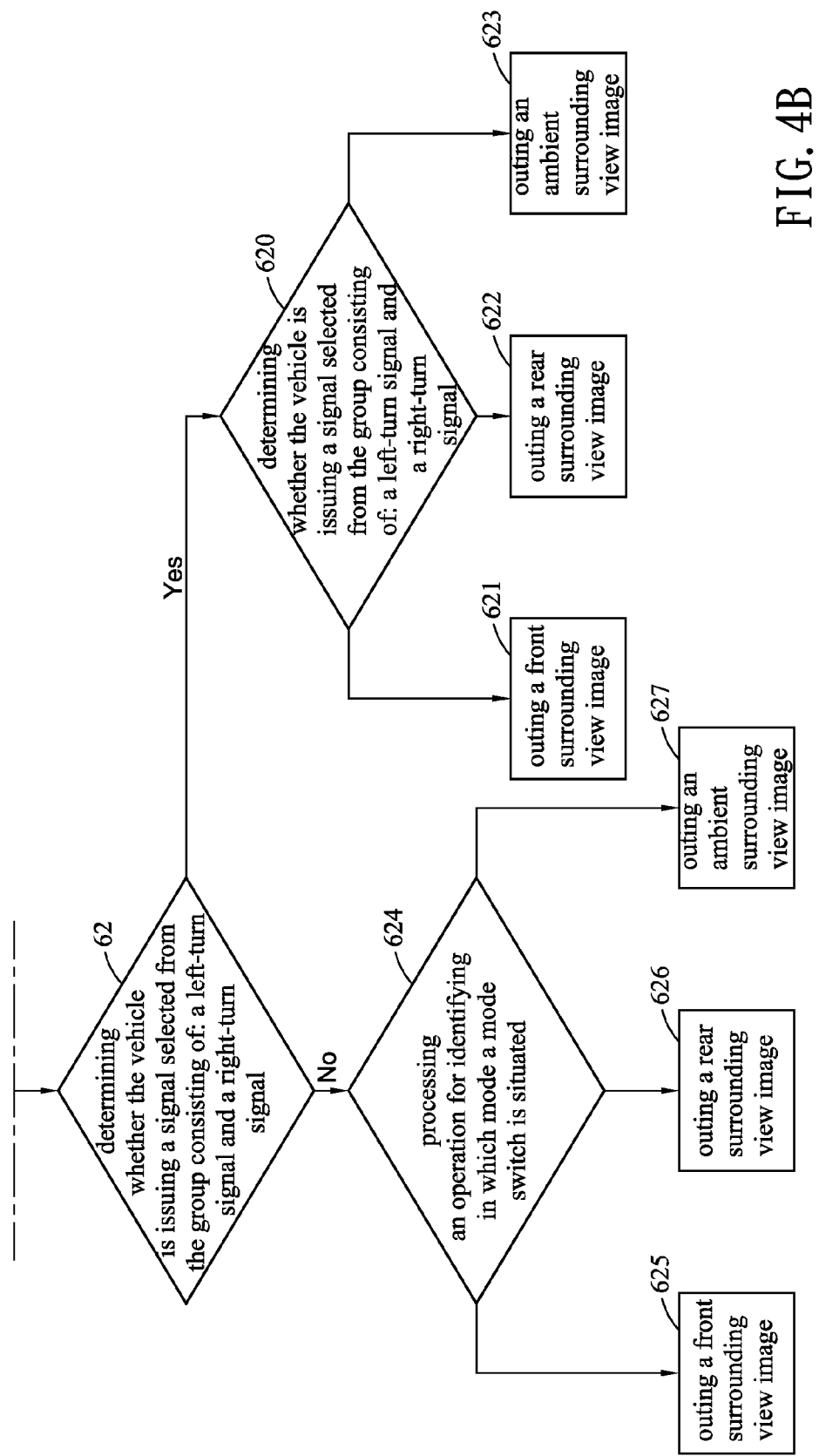
FIG. 4, being composed of FIG. 4A and FIG. 4B, is a flow chat showing steps performed in an adaptive surrounding view monitoring method according to the present disclosure.

The foregoing description only describes the components for an adaptive surrounding view monitoring apparatus and how the adaptive surrounding view monitoring apparatus is constructed using the aforesaid components. The description provided hereinafter will relates to an adaptive surrounding view monitoring method. Please refer to FIG. 4, which is composed of FIG. 4A and FIG. 4B, is a flow chat showing steps performed in an adaptive surrounding view monitoring method according to the present disclosure.

Figure 7:
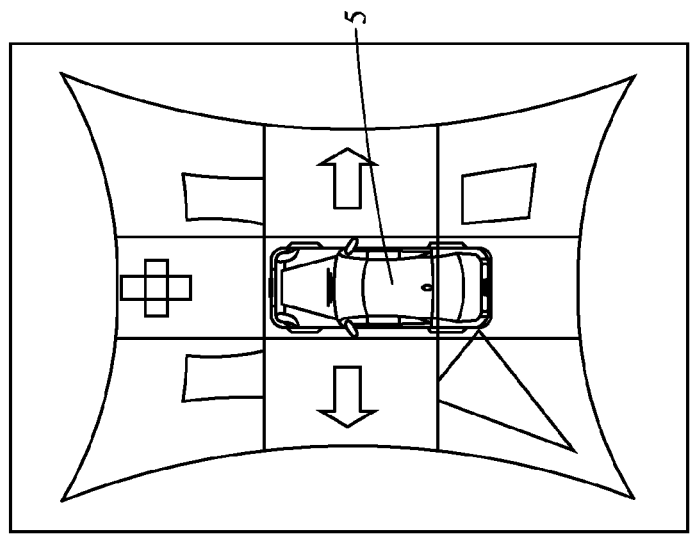
FIG. 7 is a schematic diagram showing an image of ambient surrounding view relating to a vehicle of the present disclosure.
Figure 6:
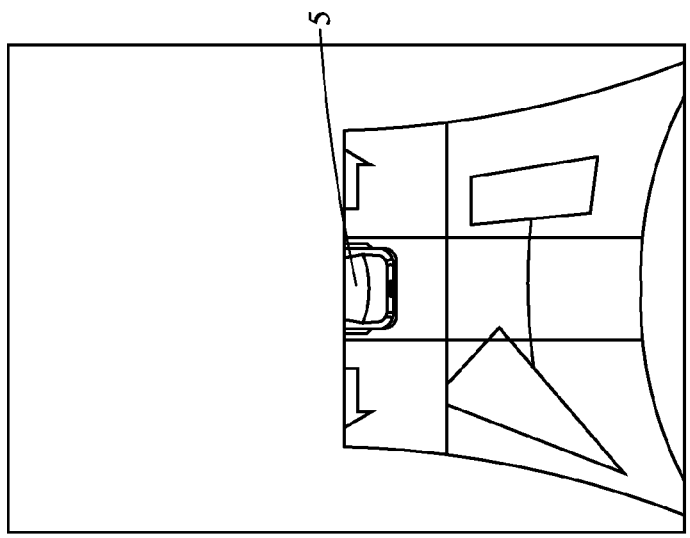
FIG. 6 is a schematic diagram showing an image of rear surrounding view relating to a vehicle of the present disclosure.
Figure 5:
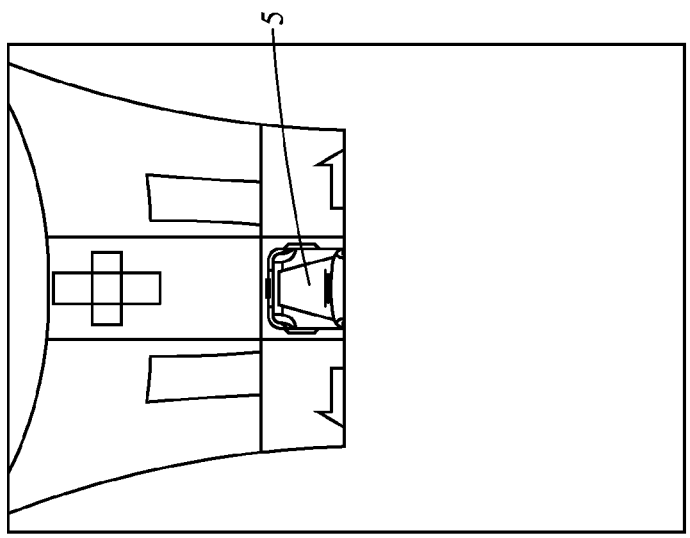
FIG. 5 is a schematic diagram showing an image of front surrounding view relating to a vehicle of the present disclosure.

In FIG. 4, the adaptive surrounding view monitoring method comprises the steps of:

step 60: making an evaluation to determine whether a moving speed of a vehicle is smaller than a threshold value, whereas the threshold value is a defined value relating to the moving speed of the vehicle that is adjustable; if the moving speed is smaller than the threshold value, the flow proceeds to step 601 for enabling a control unit 2 to be situated in an activation state and the proceeds to step 61; otherwise, the flow proceeds to step 600 for enabling the control unit 2 to be situated in a standby state;

step 61: making an evaluation to determine whether the vehicle is issuing a reverse (R) gear signal; if so, the flow proceeds to step 610 where an operation is processed for identifying in which mode a mode switch 4 is situated, and thereafter, if the mode switch 4 is identified to be situated in the front surrounding view mode 40, the flow will proceed to step 611, if the mode switch 4 is identified to be situated in the rear surrounding view mode 41, the flow will proceed to step 612, and if the mode switch 4 is identified to be situated in the ambient surrounding view mode 42, the flow will proceed to step 612; otherwise, the flow proceeds to step 62;

step 611: when the mode switch 4 is situated in the front surrounding view mode 40, enabling a camera control element 20 to control the micro process units 100, 110, 120 and motor modules 101, 111, 121 in cameras 10, 11, 12 belonging to a first steerable camera group, a second steerable camera group and a third steerable camera group, for enabling the image sensors 102, 112, 122 of the cameras 10, 11, 12 in the first steerable camera group, the second steerable camera group and the third steerable camera group to be orientated adequately for capturing images, while providing the captured images to an image processing element 23 through an image input element 21 where they are distorted, aligned and mosaicked into the image of 180-degree surrounding view to the front of the vehicle 5 to the display unit 3 through an image output element 25, as shown in FIG. 5;

step 612: when the mode switch 4 is situated in the rear surrounding view mode 41, enabling the camera control element 20 to control the cameras 11, 12, 13 belonging to the second steerable camera group and the third steerable camera group and the fourth steerable camera group, for enabling the image sensors 112, 122, 132 of the cameras 11, 12, 13 in the first steerable camera group, the second steerable camera group and the third steerable camera group to be orientated adequately for capturing images, while providing the captured images to an image processing element 23 through an image input element 21 where they are distorted, aligned and mosaicked into the image of 180-degree surrounding view to the rear of the vehicle 5 to the display unit 3 through an image output element 25, as shown in FIG. 6;

Step 613: when the mode switch 4 is situated in the ambient surrounding view mode 42, enabling the camera control element 20 to control the cameras 10, 11, 12, 13 belonging to a first steerable camera group, a second steerable camera group, a third steerable camera group and a fourth steerable camera group, for enabling the image sensors 102, 112, 122, 132 of the cameras 10, 11, 12, 13 in the first steerable camera group, the second steerable camera group, the third steerable camera group and the fourth steerable camera group to be orientated adequately for capturing images, while providing the captured images to an image processing element 23 through an image input element 21 where they are distorted, aligned and mosaicked into the image of 360-degree surrounding view to the ambient environment of the vehicle 5 to the display unit 3 through an image output element 25, as shown in FIG. 7;

step 62: determining whether the vehicle 5 is issuing a signal selected from the group consisting of: a left-turn signal and a right-turn signal, if there in no such left-turn signal or right-turn signal being issued, the flow will proceeds to step 624; otherwise, the flow proceeds to step 620;

step 620: performing the operation for identifying in which mode a mode switch 4 is situated, and thereafter, if the mode switch 4 is identified to be situated in the front surrounding view mode 40, the flow will proceed to step 621, if the mode switch 4 is identified to be situated in the rear surrounding view mode 41, the flow will proceed to step 622, and if the mode switch 4 is identified to be situated in the ambient surrounding view mode 42, the flow will proceed to step 623;

step 621: when the mode switch 4 is situated in the front surrounding view mode 40, enabling a camera control element 20 to control the cameras 10, 11, 12 belonging to a first steerable camera group, a second steerable camera group and a third steerable camera group, for enabling the image sensors 102, 112, 122 of the cameras 10, 11, 12 to be orientated adequately for capturing images, while providing the captured images to an image processing element 23 through an image input element 21 where they are distorted, aligned and mosaicked into the image of 180-degree surrounding view to the front of the vehicle 5 to the display unit 3 through an image output element 25, as shown in FIG. 5;

step 622: when the mode switch 4 is situated in the rear surrounding view mode 41, enabling the camera control element 20 to control the cameras 11, 12, 13 belonging to the second steerable camera group and the third steerable camera group and the fourth steerable camera group, for enabling the image sensors 112, 122, 132 of the cameras 11, 12, 13 in the first steerable camera group, the second steerable camera group and the third steerable camera group to be orientated adequately for capturing images, while providing the captured images to an image processing element 23 through an image input element 21 where they are distorted, aligned and mosaicked into the image of 180-degree surrounding view to the rear of the vehicle 5 to the display unit 3 through an image output element 25, as shown in FIG. 6;

step 623: when the mode switch 4 is situated in the ambient surrounding view mode 42, enabling the camera control element 20 to control the cameras 10, 11, 12, 13 belonging to a first steerable camera group, a second steerable camera group, a third steerable camera group and a fourth steerable camera group, for enabling the image sensors 102, 112, 122, 132 of the cameras 10, 11, 12, 13 in the first steerable camera group, the second steerable camera group, the third steerable camera group and the fourth steerable camera group to be orientated adequately for capturing images, while providing the captured images to an image processing element 23 through an image input element 21 where they are distorted, aligned and mosaicked into the image of 360-degree surrounding view to the ambient environment of the vehicle 5 to the display unit 3 through an image output element 25, as shown in FIG. 7;

step 624: performing the operation for identifying in which mode a mode switch 4 is situated, and thereafter, if the mode switch 4 is identified to be situated in the front surrounding view mode 40, the flow will proceed to step 625, if the mode switch 4 is identified to be situated in the rear surrounding view mode 41, the flow will proceed to step 626, and if the mode switch 4 is identified to be situated in the ambient surrounding view mode 42, the flow will proceed to step 627;

step 625: when the mode switch 4 is situated in the front surrounding view mode 40, enabling a camera control element 20 to control the cameras 10, 11, 12 belonging to a first steerable camera group, a second steerable camera group and a third steerable camera group, for enabling the image sensors 102, 112, 122 of the cameras 10, 11, 12 to be orientated adequately for capturing images, while providing the captured images to an image processing element 23 through an image input element 21 where they are distorted, aligned and mosaicked into the image of 180-degree surrounding view to the front of the vehicle 5 to the display unit 3 through an image output element 25, as shown in FIG. 5;

step 626: when the mode switch 4 is situated in the rear surrounding view mode 41, enabling the camera control element 20 to control the cameras 11, 12, 13 belonging to the second steerable camera group and the third steerable camera group and the fourth steerable camera group, for enabling the image sensors 112, 122, 132 of the cameras 11, 12, 13 in the first steerable camera group, the second steerable camera group and the third steerable camera group to be orientated adequately for capturing images, while providing the captured images to an image processing element 23 through an image input element 21 where they are distorted, aligned and mosaicked into the image of 180-degree surrounding view to the rear of the vehicle 5 to the display unit 3 through an image output element 25, as shown in FIG. 6; and step 627: when the mode switch 4 is situated in the ambient surrounding view mode 42, enabling the camera control element 20 to control the cameras 10, 11, 12, 13 belonging to a first steerable camera group, a second steerable camera group, a third steerable camera group and a fourth steerable camera group, for enabling the image sensors 102, 112, 122, 132 of the cameras 10, 11, 12, 13 in the first steerable camera group, the second steerable camera group, the third steerable camera group and the fourth steerable camera group to be orientated adequately for capturing images, while providing the captured images to an image processing element 23 through an image input element 21 where they are distorted, aligned and mosaicked into the image of 360-degree surrounding view to the ambient environment of the vehicle.

To sum up, the adaptive surrounding view monitoring apparatus and method of the present disclosure are capable of using a steerable camera set 1 to take a series of images relating to ambient environment of a vehicle 5 for overcoming the problem of image distortion that is commonly seen in the conventional bird-view images.

Moreover, by the use of the image processing element 23 for processing images while mosaicking the same seamlessly so as to be displayed either an image of 180-degree front or rear surrounding view, or an image of 360-degree ambient surrounding view on the display unit 3 without any blind spot. Consequently, as the resulting image of 180-degree front or rear surrounding view, or image of 360-degree ambient surrounding view can help eliminating all the blind spots existed surrounding the vehicle due to the obstruction of the vehicle's body structure, no additional device is required for detecting the ambient environment of the vehicle.

Furthermore, the driver of the vehicle is able to selected between the front surrounding view mode 40, the rear surrounding view mode 41, and the ambient surrounding view mode 42 using the mode switch 4, so as to consequently direct the steerable camera set 1 to be orientated adequately for capturing images to be used in the generating of required image of surrounding view.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An adaptive surrounding view monitoring apparatus, comprising:
   a steerable camera set;
   a control unit, electrically connected to the steerable camera set;
   a display unit, electrically connected to the control unit; and
   a mode switch, electrically connected to the control unit,
   wherein the control unit comprises an image input element electrically connected to the steerable camera set, and the image input element converts analog signals received from the steerable camera set into digital signals;
   wherein the steerable camera set includes four groups of cameras, which are a first steerable camera group, a second steerable camera group, a third steerable camera group and a fourth steerable camera group;
   wherein the mode switch is configured to receive an input directly from a driver to change the mode of the mode switch;
   wherein when the mode switch is situated in the front surrounding view mode, a camera control element is provided and used for controlling micro process units and motor modules in cameras belonging to a first steerable camera group, a second steerable camera group and a third steerable camera group, for enabling the image sensors of the cameras in the first steerable camera group, the second steerable camera group and the third steerable camera group to be orientated adequately for capturing images, while providing the captured images to an image processing element through an image input element where they are distorted, aligned and mosaicked into the image of 180-degree surrounding view to the front of the vehicle to the display unit through an image output element;
   wherein when the mode switch is situated in the rear surrounding view mode, a camera control element is provided and used for controlling micro process units and motor modules in cameras belonging to a second steerable camera group, a third steerable camera group and a fourth steerable camera group, for enabling the image sensors of the cameras in the second steerable camera group, the third steerable camera group and the fourth steerable camera group to be orientated adequately for capturing images, while providing the captured images to an image processing element through an image input element where they are distorted, aligned and mosaicked into the image of 180-degree surrounding view to the rear of the vehicle to the display unit through an image output element; and
   wherein when the mode switch is situated in the ambient surrounding view mode, a camera control element is provided and used for controlling micro process units and motor modules in cameras belonging to a first steerable camera group, a second steerable camera group, a third steerable camera group and a fourth steerable camera group, for enabling the image sensors of the cameras in the first steerable camera group, the second steerable camera group, the third steerable camera group and the fourth steerable camera group to be orientated adequately for capturing images, while providing the captured images to an image processing element through an image input element where they are distorted, aligned and mosaicked into the image of 360-degree surrounding view to the ambient environment of the vehicle to the display unit through an image output element.

2. The apparatus of claim 1, wherein the steerable camera set is composed of a plurality of steerable cameras, each comprising: an image sensor; a motor module, connected to the image sensor; and a micro process unit, electrically connected to the motor module.

3. The apparatus of claim 2, wherein the horizontal field of view of each steerable camera is between 30 degrees and 210 degrees.

4. The apparatus of claim 2, wherein the control unit further comprises:
   an image processing element;
   a camera control element, electrically connected to the micro process unit of each steerable camera in the steerable camera set for controlling the steerable cameras, while being electrically connected to the image processing element;
   the image input element, electrically connected to the image sensor of each steerable camera in the steerable camera set while being electrically connected to the image processing element;
   a signal processing element, being electrically connected to the image processing element;
   a memory element, being electrically connected to the image processing element; and
   an image output element, being electrically connected to the image processing element.

5. The apparatus of claim 4, wherein the control unit further comprises:
   an image database, being electrically connected to the image processing element.

6. The apparatus of claim 1, wherein the electrical connection is enabled by a means selected from the group consisting of: a wired means and a wireless means.

7. The apparatus of claim 1, wherein the mode switch has the following modes embedded therein for selection, which are a front surrounding view mode, a rear surrounding view mode and an ambient surrounding view mode.

8. An adaptive surrounding view monitoring method, comprising the steps of:
- making an evaluation to determine whether a moving speed of a vehicle is smaller than a threshold value; if so, enabling a control unit to be situated in an activation state before proceeding to the next step;
- making an evaluation to determine whether the vehicle is issuing a reverse (R) gear signal; if so, processing an operation for identifying in which mode a mode switch is situated, wherein the mode switch is configured to receive an input directly from a driver to change the mode of the mode switch;
- processing an operation for outing a front surrounding view image relating to the front of the vehicle to a display unit for displaying, if the mode switch is identified to be situated in a front surrounding view mode;
- processing an operation for outing a rear surrounding view image relating to the rear of the vehicle to a display unit for displaying, if the mode switch is identified to be situated in a rear surrounding view mode; and
- processing an operation for outing an ambient surrounding view image relating to the ambient environment of the vehicle to a display unit for displaying, if the mode switch is identified to be situated in an ambient surrounding view mode,
- wherein when the mode switch is situated in the front surrounding view mode, a camera control element is provided and used for controlling micro process units and motor modules in cameras belonging to a first steerable camera group, a second steerable camera group and a third steerable camera group, for enabling the image sensors of the cameras in the first steerable camera group, the second steerable camera group and the third steerable camera group to be orientated adequately for capturing images, while providing the captured images to an image processing element through an image input element where they are distorted, aligned and mosaicked into the image of 180-degree surrounding view to the front of the vehicle to the display unit through an image output element;
- wherein when the mode switch is situated in the rear surrounding view mode, a camera control element is provided and used for controlling micro process units and motor modules in cameras belonging to a second steerable camera group, a third steerable camera group and a fourth steerable camera group, for enabling the image sensors of the cameras in the second steerable camera group, the third steerable camera group and the fourth steerable camera group to be orientated adequately for capturing images, while providing the captured images to an image processing element through an image input element where they are distorted, aligned and mosaicked into the image of 180-degree surrounding view to the rear of the vehicle to the display unit through an image output element; and
- wherein when the mode switch is situated in the ambient surrounding view mode, a camera control element is provided and used for controlling micro process units and motor modules in cameras belonging to a first steerable camera group, a second steerable camera group, a third steerable camera group and a fourth steerable camera group, for enabling the image sensors of the cameras in the first steerable camera group, the second steerable camera group, the third steerable camera group and the fourth steerable camera group to be orientated adequately for capturing images, while providing the captured images to an image processing element through an image input element where they are distorted, aligned and mosaicked into the image of 360-degree surrounding view to the ambient environment of the vehicle to the display unit through an image output element.

9. The method of claim 8, wherein in the step of determining whether the vehicle is issuing the reverse (R) gear signal; if there is no such reverse gear signal being issued, a step for determining whether the vehicle is issuing a signal selected from the group consisting of: a left-turn signal and a right-turn signal is being performed, and if so, the operation for identifying in which mode the mode switch is situated is being enabled, and thereafter, if the mode switch is identified to be situated in the front surrounding view mode, the operation for outing the front surrounding view image relating to the front of the vehicle to the display unit for displaying is enable; if the mode switch is identified to be situated in the rear surrounding view mode, the operation for outing the rear surrounding view image relating to the rear of the vehicle to the display unit for displaying is being enabled; and if the mode switch is identified to be situated in the ambient surrounding view mode, the operation for outing the ambient surrounding view image relating to the ambient environment of the vehicle to the display unit for displaying is being enabled.

10. The method of claim 9, wherein in the step of determining whether the vehicle is issuing a signal selected from the group consisting of: a left-turn signal and a right-turn signal, if there in no such left-turn signal or right-turn signal being issued, the operation for identifying in which mode the mode switch is situated is being enabled, and thereafter, if the mode switch is identified to be situated in the front surrounding view mode, the operation for outing the front surrounding view image relating to the front of the vehicle to the display unit for displaying is enable; if the mode switch is identified to be situated in the rear surrounding view mode, the operation for outing the rear surrounding view image relating to the rear of the vehicle to the display unit for displaying is being enabled; and if the mode switch is identified to be situated in the ambient surrounding view mode, the operation for outing the ambient surrounding view image relating to the ambient environment of the vehicle to the display unit for displaying is being enabled.

11. The method of claim 8, wherein the threshold value is a defined value relating to the moving speed of the vehicle that is adjustable.

12. The method of claim 8, wherein in the step of determining whether the moving speed of the vehicle is smaller than the threshold value, if the moving speed is larger than the threshold value, the control is enabled to be situated in a standby state.

13. The method of claim 8, wherein the front surrounding view image relating to the front of the vehicle is substantially an image of 180-degree surrounding view to the front of the vehicle; the rear surrounding view image relating to the rear of the vehicle is substantially an image of 180-degree surrounding view to the rear of the vehicle; and the ambient surrounding view image relating to the ambient environment of the vehicle is an image of 360-degree surrounding view to the ambient environment of the vehicle.

14. The method of claim 8, wherein in the step of determining whether the moving speed of the vehicle is smaller than the threshold value, the cameras belonging to the first steerable camera group are disposed at the front of the vehicle, the cameras belonging to the second steerable camera group and the third steerable camera group are respectively disposed at the two sides of the vehicle; and the cameras belonging to the fourth steerable camera group are disposed at the rear of the vehicle.

15. The method of claim 8, wherein in the step of determining whether the moving speed of the vehicle is smaller than the threshold value, the control unit, the display unit and the mode switch are arranged inside the frame of the vehicle.

16. The method of claim 15, wherein the mode switch and the display unit are arranged at positions proximate to a driver of the vehicle.

* * * * *